United States Patent [19]

Prescott et al.

[11] 4,154,650
[45] May 15, 1979

[54] NUCLEAR REACTORS

[75] Inventors: Robert F. Prescott, Oadby; Brian V. George, Willoughby Waterleys; Colin J. Baglin, Littlethorpe, all of England

[73] Assignee: Nuclear Power Company Limited, London, England

[21] Appl. No.: 573,429

[22] Filed: May 1, 1975

[30] Foreign Application Priority Data

May 2, 1974 [GB] United Kingdom ............... 19426/74

[51] Int. Cl.² .............................................. G21C 9/00
[52] U.S. Cl. ....................................... 176/38; 176/64; 176/87
[58] Field of Search ....................... 176/87, 84, 38, 61, 176/64

[56] References Cited

U.S. PATENT DOCUMENTS

| | | | |
|---|---|---|---|
| 3,329,576 | 7/1967 | Rouge et al. | 176/84 |
| 3,676,297 | 7/1972 | Rennie et al. | 176/84 |
| 3,776,814 | 12/1973 | Lockett et al. | 176/87 |

*Primary Examiner*—Samuel W. Engle
*Assistant Examiner*—Ralph Palo

*Attorney, Agent, or Firm*—Kirschstein, Kirschstein, Ottinger & Cobrin

[57] ABSTRACT

In a nuclear reactor (e.g. one having coolant down-flow through a core to a hearth below) thermal insulation (e.g. of a floor of the hearth) comprises a layer of bricks and a layer of tiles thereon, with smaller clearances between the tiles than between the bricks but with the bricks being of reduced cross-section immediately adjacent the tiles so as to be surrounded by interconnected passages, of relatively large dimensions, constituting a continuous chamber extending behind the layer of tiles. By this arrangement, lateral coolant flow in the inter-brick clearances is much reduced.

The reactor core is preferably formed of hexagonal columns, supported on diamond-shaped plates each supported on a pillar resting on one of the hearth-floor tiles. Each plate has an internal duct, four upper channels connecting the duct with coolant ducts in four core columns supported by the plate, and lower channels connecting the duct to a downwardly-open recess common to three plates, grouped to form a hexagon, at their mutually-adjacent corners. This provides mixing, and temperature-averaging, of coolant from twelve columns.

12 Claims, 3 Drawing Figures

NUCLEAR REACTORS

This invention relates to fluid-cooled nuclear reactors and, more precisely, to the provision of thermal insulation on inner surfaces of a containment vessel of such a reactor particularly in situations where the thermal insulation must also serve a structural function and transmit substantial load forces to the surface which it covers.

A typical situation in which thermal insulation is required both to insulate and to transmit substantial load forces is on the floor of the "hearth" of a nuclear reactor with downward coolant flow through the reactor core, such that thermal insulation provided on the floor of insulate hearth below the core must not only insulte the floor thermally from the coolant while the latter is at its highest temperature but must also transmit the weight of the core to the floor. A nuclear reactor of this kind is described in co-pending application Ser. No. 516,358 filed Oct. 21, 1974 and the thermal insulation 17A referred to therein may, with advantage, be in accordance with the present invention.

The invention also relates to the provision, in such a nuclear reactor, of core support means of a novel and advantageous kind which favourably influences the flow of hot coolant from the lower end of the core into a hot-coolant plenum space defined in the hearth of the reactor.

According to the invention in its broadest aspect, then, there is provided, in a nuclear reactor, a layer of thermal insulation comprising a course of bricks, of thermally insulating material, arranged as a mosaic covering a wall surface of the reactor, and a course of tiles also of thermally insulating material, arranged as a mosaic covering the course of bricks, each brick having a first end which is located on the wall surface and a second end which is remote therefrom and has mounted on it a respective one of the tiles, the bricks being disposed with lateral inter-brick clearances between them and the tiles being disposed with lateral inter-tile clearances between them, p1 wherein the inter-tile clearances are smaller than the inter-brick clearances, and the bricks are of reduced external cross-section at their said second ends and there are thereby formed, around the said second ends, inter-connected spaces of which the dimensions are large compared with the said inter-brick clearances.

The invention further provides that, in a nuclear reactor which comprises a reactor core and a hearth therebelow, the hearth may have a floor constituted by a layer of thermal insulation as specified in the preceding paragraph.

According to a further feature of the invention, such a reactor may have its core composed of hexagonal columns which are supported on diamond-shaped base plates of 60° and 120° angles each of which covers an area equal to the cross-sectional area of four of the core columns and is supported at its centre by a vertical support pillar which is itself supported on a respective one of the tiles of the hearth floor.

Preferably, then, a group of three base plates having mutually-adjacent 120° angle corners form a hexagon and have their lower surfaces recessed at those corners to form a common recess of the group, each of the three base plates being formed with an internal duct, lower channels connecting the internal duct to the common recess, and four upper channels opening into the internal duct from the upper surface of the base plate, each of the said upper channels communicating with a respective duct formed at the lower end of a respective one of four core columns supported on that base plate.

A preferred embodiment of the various features and aspects of the invention is disclosed and described more fully below with reference to the accompanying drawings, in which.

Figure 1:
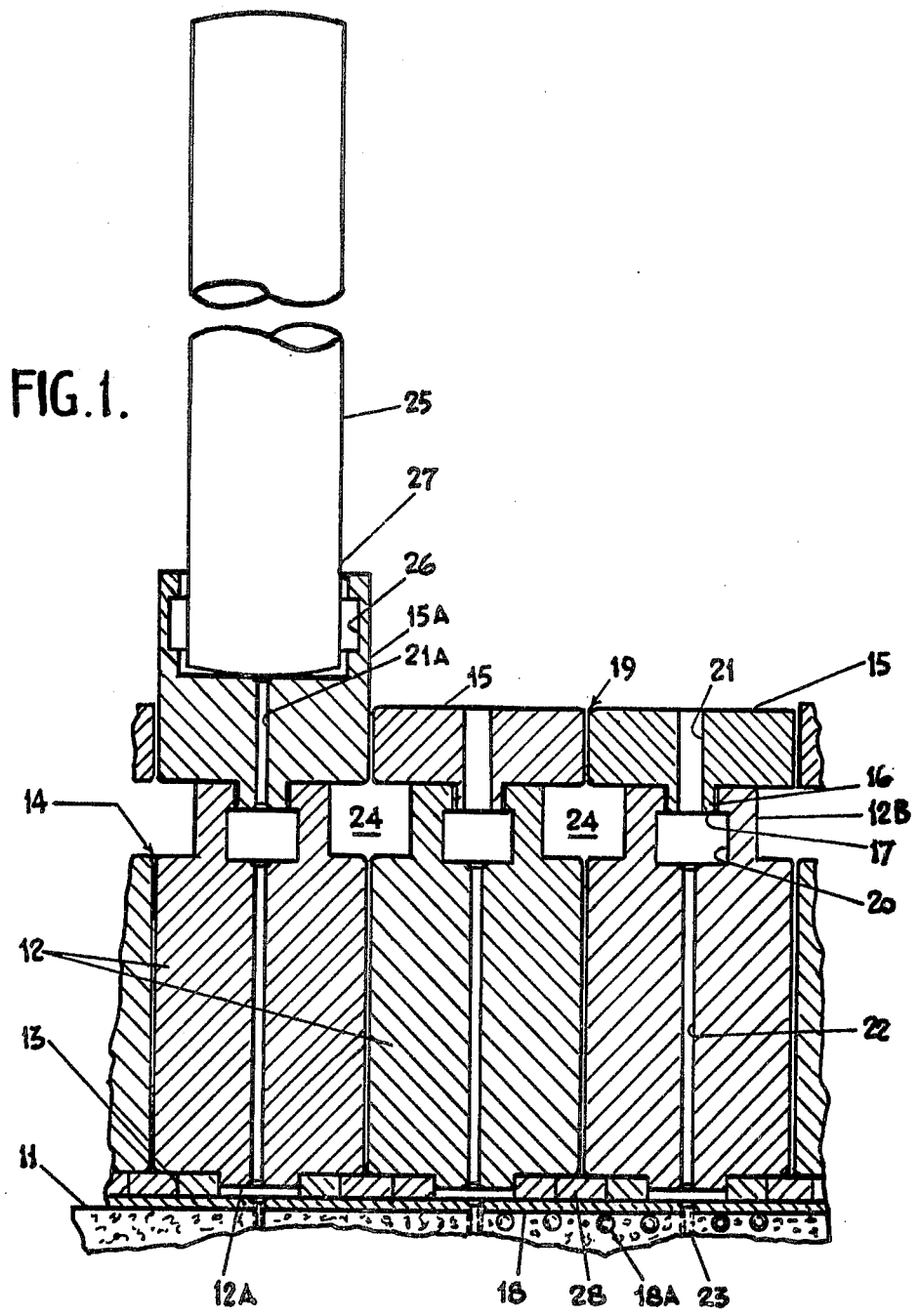
FIG. 1 is a vertical sectional view taken through part of the floor of a nuclear reactor containment vessel and a layer of thermal insulation provided thereon.

FIG. 1 shows part of a concrete pressure vessel 11 of a nuclear reactor, and of a fluid-tight steel liner 18 which is provided on inner surfaces of the vessel and which is cooled by a coolant fluid, such as water, flowing in pipes 18A in contact with it and embedded in the adjacent concrete. The illustrated parts of the vessel 11 and liner 18 constitute part of the floor of the vessel, defining a "hearth" of the reactor (which latter may be generally as shown in and described with reference to FIG. 1 of the co-pending application referred to above); and the liner 18 is provided with a thermally insulating layer of bricks which in that case corresponds to the hearth bricks 17A referred to in the said co-pending application.

For locating the bricks (which are indicated in the present description by reference numeral 12), the liner 18 has steel locating collars 13 welded to it, the collars 13 being disposed with their centres on a regular equilateral triangular lattice and preferably being welded to the liner 18 after the liner has been fitted in the vessel 11 and being then finally machined in situ to ensure that they are correctly centred within allowable tolerances. The bricks 12 are of hexagonal cross-section, but formed at their lower ends each with a circular-section spigot 12A which is a close fit in a circular recess provided by any of the collars 13. The bricks 12, whose hexagonal-section part may be some 60 cm. high, together form a hexagonal mosaic in which, however, it is necessary that there should be a nominal inter-brick clearance of some 6 mm. between adjacent faces of adjacent bricks, in order to allow for practical tolerances in the positioning of the collars 13 and in the positioning, shape and dimensions of the bricks. The bricks are of ceramic material (for example, alumina or aluminium silicate or the material known as "cast fused silica" which is made by moulding, and then drying and heating, a slurry of silica sand and/or powder). Cast fused silica is available (from a French source) under the name MASROCK or from the British companies Gimson Ltd., under the name NORSIL, and Pickford Holland Ltd. Bricks of cast fused silica have inherently good thermal insulation, but this property would normally be largely vitiated by the relatively large inter-brick clearances, between bricks, since these clearances constitute a honeycomb network of interconnected passages 14 across the floor of the reactor hearth, and there would be a substantial flow of hot reactor coolant through these passages due to the fact that the coolant pressure in the hearth space above the bricks will be substantially greater at the centre of the hearth floor than at those regions at the edge of the floor at which the circulating coolant leaves the hearth.

In order, therefore, to reduce the flow of hot coolant in the network of passages 14, there is provided above the bricks 12 a layer of hexagonal graphite tiles 15 which also form a hexagonal mosaic, of the same pitch as that of the bricks 12, and in register therewith, but with much smaller inter-tile clearances between the adjacent edge faces of adjacent tiles.

Each of the tiles 15 has a downwardly extending central spigot 16 which fits loosely within an endwise central aperture 17 provided in the upper end of each of the bricks 12. Thus, after the rings 13 have been secured in position and machined, the bricks 12 would be assembled in their mosaic and then each such brick is capped by a respective one of the tiles 15. The easy clearance fit of the spigots 16 in the apertures 17 enables the tiles to be correctly positioned relative to one another even though there may be some errors in the positions of the tops of the bricks 12 (whose bottom ends are located by the collars 13); and the tiles 15 may be so dimensioned that the nominal inter-tile clearance 19 between adjacent edge faces of adjacent tiles is less than 1 mm., as compared with the corresponding inter-brick clearances 14 of some 6 mm. required between the bricks 12. Preferably, as the tiles 15 are set in position, their spigots 16 are cemented into the apertures 17 of the bricks 12, so that each such tile becomes effectively integral with its respective brick, but with the tile correctly positioned even if there is some mispositioning of the upper end of the brick.

The apertures 17, and recesses 20 into which they open, enable handling means (not shown) to engage the bricks to transport them and lower them into their illustrated assembled positions, and to remove any individual brick in the event that it becomes damaged during use of the reactor. Such removal is not prevented by the presence of a cemented-in tile 15, since each tile 15 has a bore 21 through which the handling means can enter the recess 20. Each brick 12 also has an axial bore 22, which aligns with a respective channel 23 through the liner 18 and through the concrete of the vessel 11. The bores 21 and 22 and channels 23 are provided principally to enable connections to be made to thermocouples and other instrumentation disposed in the reactor core above the hearth. Any such bore which is redundant can, of course, be blocked off if desired.

The provision of the narrow clearances 19 between the tiles 15 would not be itself produce a sufficient reduction in the rate of flow of hot coolant into and horizontally through the wider clearances between the bricks 12; but, additionally, the upper ends 12B of the bricks 12, on which the tiles 15 are positioned, are made of reduced external cross-section so that below the tiles and surrounding the upper ends of the bricks there are formed interconnected spaces which constitute a chamber 24. This chamber 24 which extends continuously across the whole floor, surrounding all the brick upper ends 12B, provides for relatively unrestricted flow horizontally across the floor in any direction. If a large coolant pressure differential exists between two horizontally-spaced regions above the tiles 15, substantial coolant flow will be induced downward through the inter-tile clearances 19 below the higher-pressure region and upward through the inter-tile clearances 19 below the lower-pressure region, with a flow laterally through the chamber 24 from below the higher-pressure region to below the lower-pressure region; but most of the pressure drop will be accounted for in the clearances 19, where the flow is at relatively high velocity because of the restricted cross-section, and there will be only a much-reduced pressure gradient horizontally through the chamber 24 (as compared with that in the coolant fluid above the tiles 15). Accordingly the flow of hot coolant in the network of channels 14 between the bricks 12 will be much reduced by the provision, in combination, of the narrow clearances 19 and the continuously-extending chamber 24 between them and the inter-brick clearance passages 14. In fact, the pressure gradient horizontally through the chamber 24 can easily be made less by a factor of some 300 than that across the upper surfaces of the tiles 15, and the coolant flow through the channels 14 can accordingly be reduced by a similar factor, so that the thermal insulating effect of the bricks 12 as a whole (inter-brick clearance gaps included) can be made satisfactorily good.

The clearances 19 are made as small as possible. In practice, in a reactor in which the coolant above the tiles 15 would be at a temperature of about 725° C. during normal operation, the clearances 19 may be designed to accommodate only the thermal expansion of the tiles 15 which would occur if, with the reactor in a fault condition, the coolant temperature were to rise to 1,000° C.

It will be understood that, although a damaged brick 12 may be removed even if it has a tile 15 cemented in position on its upper end, it would have to be replaced by a new brick and a new tile separately so that the new brick may be fitted between the existing surrounding bricks and the new tile may be fitted (independently) between the existing surrounding tiles. Thus the new brick and new tile will not be cemented together after fitting; but the new tile will be adequately located by its weight and by the surrounding tiles.

It should be understood, also, that the bores 21 and 22, although they allow penetration of hot coolant (to the extent that they are not completely plugged by instrumentation leads or otherwise) do not present the same insulation problem as the passages 14, because the bores are isolated from one another and do not permit a flow of coolant.

Those of the tiles 15 which are to support the support pillars (14 in FIG. 1 of the above-mentioned co-pending application) which transmit the weight of the superposed reactor core are of a modified form; in FIG. 1 of the accompanying drawings, one is shown referenced 15A, supporting the lower end of a support pillar which is referenced 25. The tile 15A, which has the same hexagonal cross-section as the tiles 15, is of greater height and is formed with a recess 26, with an upper rim 27, in which the lower end of the pillar 25 is received. In the event that that part of the reactor core which normally rests on and locates the upper end of the pillar 25 has to be removed, the pillar 25 may lean slightly but will be held by the rim 27 in a position from which it can again be put under load as the removed part of the core is reassembled.

Because of the need to provide a proper seating for the support pillar 25, it is probably not practicable to provide the tile 15A with a central bore wide enough (like the bores 21 of the tiles 15) to accept a brick handling tool; instead, a narrower bore 21A is provided, and the tile 15A would not be cemented into the brick below it but would be left separately removable so as to give subsequent access to the brick itself.

Below the bricks 12, the space between the collars 13 is preferably filled with ceramic fibre, preferably in preformed units 28 each having a steel envelope in which the fibre is contained. Since the collars 12 are on an equilateral triangular lattice, each such unit may be shaped like an equilateral triangle with its vertices removed to accommodate the rings.

As indicated in FIG. 1, it is not necessary that every one of the bricks 12 should assist in the transmission to the pressure vessel 11 of the weight of the reactor core. In fact, in a novel and very satisfactory arrangement now to be described, only one in four of the bricks 12 will serve this duty, being fitted for the purpose with a tile 15A to receive a respective support pillar 25.

Figure 2:
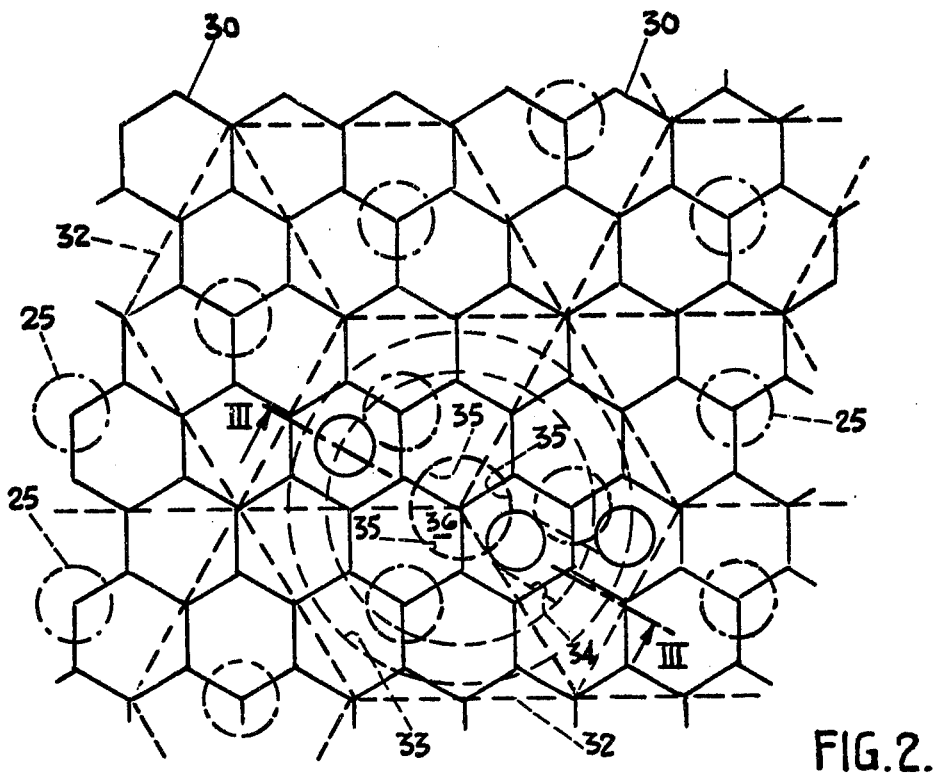
FIG. 2 is a schematic plan view, on a smaller scale, of a nuclear reactor core which may be supported on the floor shown in FIG. 1.

As shown in FIG. 2, the core of a reactor is composed of hexagonal columns 30, and in known manner each column is composed of a stack of hexagonal-section bricks. The bricks at the centre of the column contain nuclear fuel, and compose the active core, the bricks immediately below and above the fuelled bricks serve as neutron reflectors, and the uppermost and lowermost bricks serve as shield bricks. Coolant is made to flow down through each column, and in the lowermost brick 30A of each column (see FIG. 3) flows through a single duct 31 formed in the brick.

Figure 3:
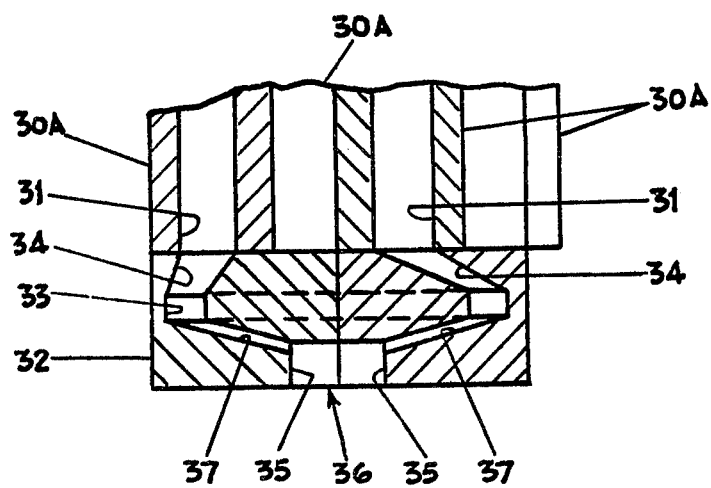
FIG. 3, on the same scale as FIG. 2, is a sectional view taken on the line III—III of FIG. 2.

To support the columns 30 in position, the novel arrangement shown in FIGS. 2 and 3 provides a platform of diamond-shaped base plates 32 with 60° and 120° angles, whose position relative to the columns 30 is indicated by straight broken lines in FIG. 2. Each plate 32, which covers an area equal to the cross-sectional area of four of the columns 30, is supported at its centre by one of the support pillars 25 shown in FIG. 1, the hexagon size of the columns 30 being the same as that of the tiles 15 and bricks 12. It will be seen from FIG. 2 that the centre of each plate 32 (and thus the axis of each support pillar 25) coincides with the corners of three columns 30, whereas the pillar axis coincides with the axis of a respective brick 12. Thus the hexagonal mosaic pattern of the columns 30 is offset relative to that of the bricks 12 and tiles 15, though it is of the same size or pitch.

The plates 32 are in groups of three, each group forming a hexagon, and each plate is formed internally with a part-annular duct 33 so that each group of three plates has an annular duct (though the part-annular ducts may be stopped off at the edges of the plates so that the annular duct which three of them together constitute may not be a continuous annular duct). Each plate 32 carries the major parts of four columns 30, and the ducts 31 of the four lowermost bricks 30A of these four columns open into respective channels 34 in the plates 32, which channels in turn open into the part-annular duct 33. Each plate 32 is formed at one of its corners with a recess 35 in its lower surface, so that the recesses 35 of the three plates of a group together form a circular recess 36; and in each plate a substantial number (such as twelve) of radial ducts 37 connect the part-annular duct 33 with the recess 35. Thus each recess 36 receives the hot coolant gas emerging from twelve of the columns 30. Preferably the total cross-sectional area of the ducts 37 of a group of three plates 30 is substantially less than that of the ducts 31 of the twelve bricks 30A supported by those plates, so that the coolant emerges into the recess 36 at high velocity and thorough mixing of the coolant occurs in that recess. Downwardly, the recesses 36 are open to the space above the tiles 15, and it will be apparent that the coolant from any column 30, as it enters that space, has already been mixed with the coolant from eleven other channels, and in consequence the effects of some overheating in any column 30 are minimised in the space below the plates 32. This means that greater temperature deviations can be tolerated in the individual columns 30 than would otherwise be the case, which in turn means that the control of temperature by gagging in each column need be less strict and that simpler gagging arrangements, with less pressure drop in the core, are permissible. This in turn means that the power consumed in circulating the coolant can be reduced, or is used more effectively. Another consequence of the greater permissible temperature deviation is that nuclear fuel can be left longer in the reactor, since the reduced heating produced by fuel near the end of its useful life can be tolerated.

It will be understood that, for the sake of clarity, most of the ducts 31 and other detailed features have been omitted from FIG. 2.

It will be understood also that, to remove and replace damaged bricks 12 and tiles 15 as shown in FIG. 1, use is made of the refuelling machine which will in any event be provided for handling bricks of the columns 30, and that sufficient of the columns 30 must be removed to allow at least one of the plates 32 to be removed also, before bricks 12 can be removed.

We claim:

1. In a nuclear reactor, a layer of thermal insulation comprising a course of bricks, of thermally insulating material, arranged as a mosaic covering a wall surface of the reactor, and a course of tiles, also of thermally insulating material, arranged as a mosaic covering the course of bricks, each brick having a first end which is located on the wall surface and a second end which is remote therefrom and has mounted on it a respective one of the tiles, the bricks being disposed with lateral inter-brick clearances between them, and the tiles being disposed with lateral inter-tile clearances between them, wherein the inter-tile clearances are smaller than the inter-brick clearances, and the bricks are of reduced external cross-section at their said second ends and there are thereby formed, around the said second ends of each two laterally adjacent bricks, interconnected unrestricted chamber spaces of which the dimensions are large compared with the said inter-brick clearances.

2. A layer of thermal insulation as claimed in claim 1, wherein the bricks and the tiles form respective mosaics of equal pattern and pitch and in register with one another.

3. A layer of thermal insulation as claimed in claim 1, wherein the said one end of each brick is formed as a circular-section spigot located in a circular recess provided on the said wall surface.

4. A layer of thermal insulation as claimed in claim 1, wherein the said second end of each brick has an endwise central aperture and the tile mounted on such brick has a spigot which projects into such aperture as a loose fit therein.

5. A layer of thermal insulation as claimed in claim 4, wherein the loose-fitting spigots of the tiles are cemented into the respective central apertures of the bricks.

6. A layer of thermal insulation as claimed in claim 1, wherein the bricks and tiles are each formed with a central bore.

7. A layer of thermal insulation as claimed in claim 1, wherein the bricks are of equal regular-hexagon cross-section and the tiles are also of regular-hexagon cross-section and slightly larger cross-sectional area than the bricks.

8. A nuclear reactor comprising a reactor core and a hearth therebelow, wherein the hearth has a floor constituted by a layer of thermal insulation as claimed in claim 1.

9. A nuclear reactor as claimed in claim 8, wherein some of the tiles support means which, in turn, contribute to supporting the weight of the core.

10. A nuclear reactor as claimed in claim 9, wherein the core is composed of hexagonal columns and the said means comprise column-supporting diamond-shaped base plates of 60° and 120° angles, each of which covers an area equal to the cross-sectional area of four of the core columns, and vertical support pillars each of which supports a respective one of said base plates at the centre thereof and is itself supported on a respective one of the tiles of the hearth floor.

11. A nuclear reactor as claimed in claim 10, wherein a group of three base plates having mutually-adjacent 120°-angle corners form a hexagon and have their lower surfaces recessed at those corners to form a common recess of the group, each of the three base plates being formed with an internal duct, lower channels connecting the internal duct to the common recess, and four upper channels opening into the internal duct from the upper surface of the base plate, each of the said upper channels communicating with a respective duct formed at the lower end of a respective one of four core columns supported on that base plate.

12. A nuclear reactor as claimed in claim 11, wherein the common recess is of circular cross-section and each internal duct is part annular, centred in each case on the centre of the said hexagon, and the said lower channels are radial about the same centre.

* * * * *